United States Patent
Roberts et al.

(10) Patent No.: US 10,802,985 B2
(45) Date of Patent: *Oct. 13, 2020

(54) GPU VIRTUALISATION

(71) Applicant: Imagination Technologies Limited, Kings Langley (GB)

(72) Inventors: Dave Roberts, Saratoga, CA (US); Mario Sopena Novales, Hertfordshire (GB); John W. Howson, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/442,138

(22) Filed: Jun. 14, 2019

(65) Prior Publication Data
US 2019/0294556 A1 Sep. 26, 2019

Related U.S. Application Data

(63) Continuation of application No. 15/367,370, filed on Dec. 2, 2016, now Pat. No. 10,366,012.

(51) Int. Cl.
*G06F 12/1009* (2016.01)
*G06F 13/16* (2006.01)
(Continued)

(52) U.S. Cl.
CPC ...... *G06F 12/1009* (2013.01); *G06F 9/45558* (2013.01); *G06F 13/16* (2013.01);
(Continued)

(58) Field of Classification Search
CPC .. G06F 12/1009; G06F 9/45558; G06F 13/16; G06T 1/20; G06T 1/60
See application file for complete search history.

(56) References Cited

U.S. PATENT DOCUMENTS

| 7,623,134 B1 | 11/2009 | Danilak |
| 8,200,796 B1 | 6/2012 | Margulis |

(Continued)

FOREIGN PATENT DOCUMENTS

| WO | 2011/011769 A1 | 1/2011 |
| WO | 2012/087984 A2 | 6/2012 |
| WO | 2015124899 A1 | 8/2015 |

OTHER PUBLICATIONS

Anonymous: "System Bus"; Feb. 2, 2009; Retrieved from the Internet: URL:http://web.archive.org/web/20090202072835/https://www.mtholyoke.edu/courses/dstrahma/cs221/olr/olr11.htm [retrieved on Aug. 16, 2019]; 7 pages.

(Continued)

*Primary Examiner* — Sarah Lhymn
(74) *Attorney, Agent, or Firm* — Potomac Law Group, PLLC; Vincent M DeLuca

(57) ABSTRACT

A method of GPU virtualization comprises allocating each virtual machine (or operating system running on a VM) an identifier by the hypervisor and then this identifier is used to tag every transaction deriving from a GPU workload operating within a given VM context (i.e. every GPU transaction on the system bus which interconnects the CPU, GPU and other peripherals). Additionally, dedicated portions of a memory resource (which may be GPU registers or RAM) are provided for each VM and whilst each VM can only see their allocated portion of the memory, a microprocessor within the GPU can see all of the memory. Access control is achieved using root memory management units which are configured by the hypervisor and which map guest physical addresses to actual memory addresses based on the identifier associated with the transaction.

20 Claims, 5 Drawing Sheets

(51) Int. Cl.
*G06F 9/455* (2018.01)
*G06T 1/20* (2006.01)
*G06T 1/60* (2006.01)

(52) U.S. Cl.
CPC .................. *G06T 1/20* (2013.01); *G06T 1/60* (2013.01); *G06F 2009/45583* (2013.01); *G06F 2212/1024* (2013.01); *G06F 2212/1052* (2013.01); *G06F 2212/151* (2013.01); *G06F 2212/152* (2013.01); *G06F 2212/651* (2013.01); *G06F 2212/657* (2013.01)

(56) References Cited

U.S. PATENT DOCUMENTS

| | | |
|---|---|---|
| 2007/0038996 A1 | 2/2007 | Ben-Yehuda |
| 2010/0235598 A1 | 9/2010 | Bouvier |
| 2014/0068138 A1* | 3/2014 | Patel .................. G06F 9/45558 711/6 |
| 2014/0173600 A1* | 6/2014 | Ramakrishnan Nair .................... G06F 9/45533 718/1 |
| 2014/0258446 A1* | 9/2014 | Bursell ................. G06F 15/177 709/217 |
| 2014/0354667 A1 | 12/2014 | Lin et al. |
| 2015/0242319 A1 | 8/2015 | Evans et al. |
| 2015/0254189 A1 | 9/2015 | Coppola |
| 2015/0277949 A1* | 10/2015 | Loh ..................... G06F 9/45558 711/152 |
| 2015/0293776 A1 | 10/2015 | Persson et al. |
| 2018/0341503 A1* | 11/2018 | Nair ........................ G06F 21/60 |

OTHER PUBLICATIONS

Tian et al., "A full GPU Virtualization Solution with Mediated Pass-Through", Proceedings of USENIX ATC 2014, pp. 121-132, available from https://www.usenix.org/system/files/conference/atc14/atc14-papertian.pdf.

* cited by examiner

GPU VIRTUALISATION

CROSS-REFERENCE TO RELATED APPLICATIONS AND CLAIM OF PRIORITY

This application is a continuation under 35 U.S.C. 120 of copending application Ser. No. 15/367,370 filed Dec. 2, 2016, which claims priority under 35 U.S.C. 119 from United Kingdom Application No. 1521250.9 filed Dec. 2, 2015.

BACKGROUND

Current computing systems often comprise a central processing unit (CPU) and a graphics processor unit (GPU), which may also be referred to as a video processing unit (VPU). GPUs are processors which have a highly parallel structure and which are typically used for graphics operations such as texture mapping and rendering polygons. Graphics commands are sent from the CPU to the GPU (via a GPU driver) and are executed on the GPU.

In many situations, the CPU may run a number of virtual machines (VMs) which each run an operating system (e.g. where the operating systems running on different VMs may be the same or different). The VMs are created and supervised by software which is called a hypervisor (or virtual machine monitor, VMM) and which controls each VM's access to the hardware within a computing system. Consequently, communications between the operating systems (running on the VMs) and the GPU often go through the hypervisor which is responsible for enforcing security.

The embodiments described below are provided by way of example only and are not limiting of implementations which solve any or all of the disadvantages of known methods of virtualizing GPUs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of GPU virtualization comprises allocating each virtual machine (or operating system running on a VM) an identifier by the hypervisor and then this identifier is used to tag every transaction deriving from a GPU workload operating within a given VM context (i.e. every GPU transaction on the system bus which interconnects the CPU, GPU and other peripherals). Additionally, dedicated portions of a memory resource (which may be GPU registers or RAM) are provided for each VM and whilst each VM can only see their allocated portion of the memory, a microprocessor within the GPU can see all of the memory. Access control is achieved using root memory management units which are configured by the hypervisor and which map guest physical addresses to actual memory addresses based on the identifier associated with the transaction. Software running in the microprocessor within the GPU is involved in managing the workloads for the different VMs (e.g. instead of relying upon hypervisor software running in the CPU to control and manage the workloads).

A first aspect provides a computing system comprising: a central processing unit arranged to run a plurality of virtual machines under the control of a hypervisor and wherein transactions output by the central processing unit are assigned an identifier for the virtual machine to which it relates; a CPU memory management unit arranged to translate between virtual memory addresses used by the virtual machines and guest physical addresses; a first root memory management unit configured by the hypervisor and arranged to translate between guest physical addresses used by the CPU memory management unit and actual physical memory addresses based on the identifier for the virtual machine assigned to the transaction; a graphics processor unit comprising a microprocessor and wherein transactions output by the graphics processor unit are assigned an identifier for a virtual machine which is inherited from a triggering transaction received from the central processing unit; a GPU memory management unit arranged to translate between virtual memory addresses used by the graphics processor unit and guest physical addresses; and a second root memory management unit configured by the hypervisor and arranged to translate between guest physical addresses used by the GPU memory management unit and actual physical memory addresses based on the identifier for the virtual machine assigned to the transaction; and wherein access to one or more portions of a memory resource is controlled as a consequence of the address translations performed by the root memory management units.

A second aspect provides a method comprising: allocating, by a hypervisor, a portion of a memory resource and an identifier to each of a plurality of virtual machines running on a central processing unit; configuring translation tables in a first and a second root memory management unit, wherein the translation tables define translations between guest physical addresses and actual physical memory addresses based on an identifier for the virtual machine, the first root memory management unit being associated with the central processing unit and the second root memory management unit being associated with a graphics processor unit; and during execution of one or more of the virtual machines, tagging transactions output by the central processing unit with the identifier for the virtual machine to which the transaction relates and, within the root memory management units, translating addresses in a transaction based in the identifier with which the transaction is tagged.

Further aspects provide a method of manufacturing, at an integrated circuit manufacturing system, a computing system as described herein, an integrated circuit definition dataset that, when processed in an integrated circuit manufacturing system, configures the system to manufacture a computing system as described herein and a computer readable storage medium having stored thereon an integrated circuit definition dataset that, when processed in an integrated circuit manufacturing system, configures the system to manufacture a computing system as described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
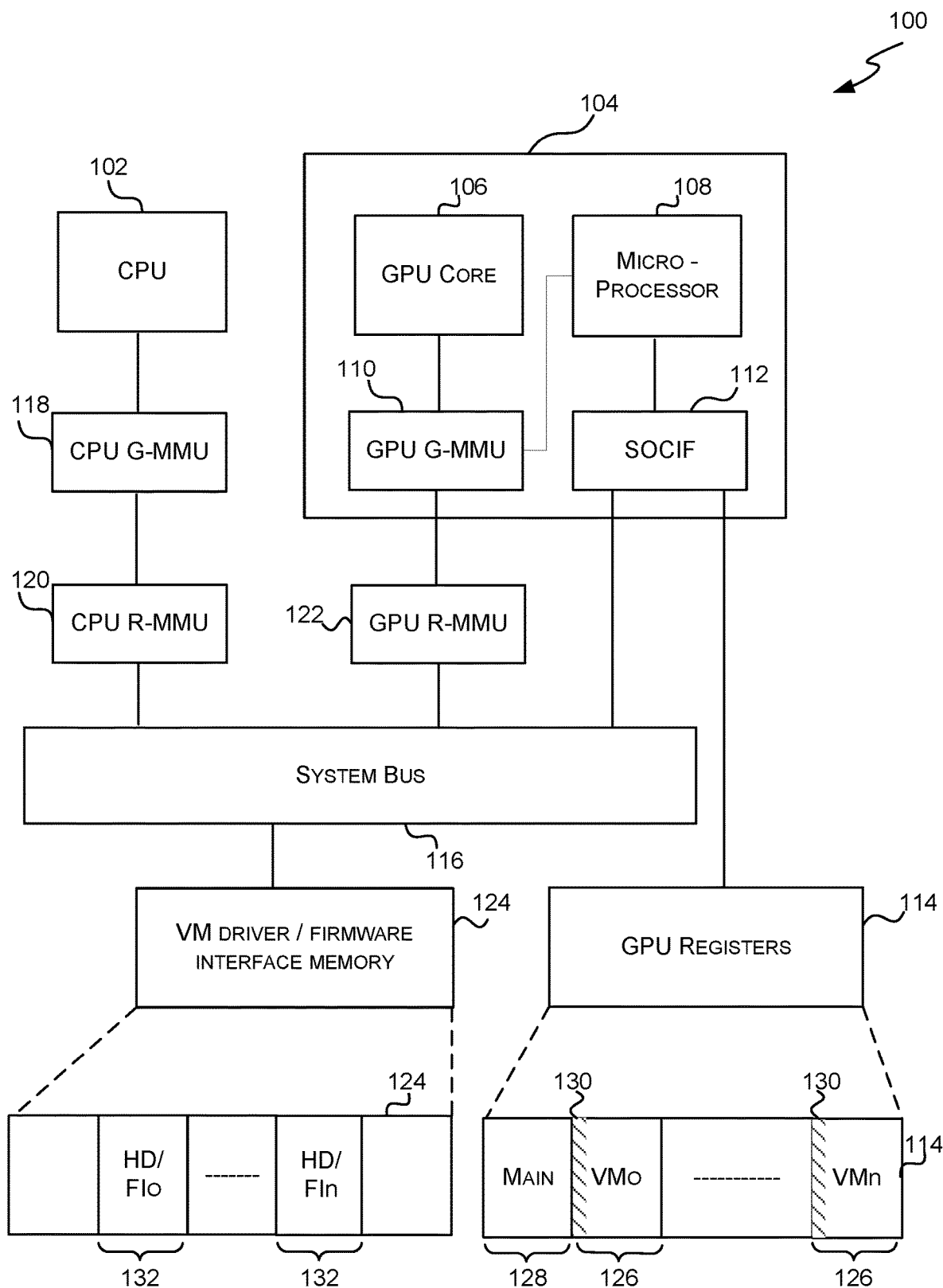
FIG. 1 is a schematic diagram of a computing system comprising a CPU and a GPU with an embedded microprocessor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, where a GPU is shared between multiple VMs (e.g. there may be up to 8 VMs running on a CPU or there may be more than 8 VMs running on a CPU), all communications between the operating systems running on the VMs and the GPU go via the hypervisor. This can introduce a performance penalty as a result of additional calls to and from the hypervisor and/or context switches (e.g. as derived by the hypervisor). Existing solutions to this either provide a dedicated GPU for each VM (i.e. by duplicating the entire GPU hardware) or dedicate one or more contexts to each VM (e.g. where the GPU supports multiple independent contexts). Providing multiple GPUs increases the size (and hence cost) of the system and may be inefficient (e.g. where 8 GPUs are provided and less than 8 VMs are running). Dedicating one or more contexts to each VM (a technique known as 'mediated pass-through') still involves the CPU in scheduling the work for the GPU across the VMs (which introduces latency of the round-trip to the CPU and uses CPU resources) and may require changes to the GPU drivers on the VMs.

Described herein is a method of GPU virtualization in which each VM (or operating system running on a VM) is allocated an identifier (OS_ID) by the hypervisor (e.g. on set-up) and then this OS_ID is used to tag every transaction between a VM and the GPU (i.e. every GPU transaction on the system bus which interconnects the CPU and the GPU). Additionally, dedicated GPU registers are provided for each VM and whilst each VM can only see (i.e. access) their own GPU registers, the GPU can see all the GPU registers. The combination of the OS_IDs and dedicated GPU registers, enables different jobs (which may be graphics or computing jobs) from different VMs (and hence different operating systems) to run on the GPU concurrently (e.g. in different GPU pipelines) and eliminates the need for every communication from a VM to the GPU to involve the hypervisor. This results in a performance improvement.

FIG. 1 is a schematic diagram of a computing system 50 comprising a CPU 52 and a GPU 54. The diagram only shows hardware and so the VMs and hypervisor which run on the CPU are not shown. The GPU 54 comprises a GPU core 56 which comprises the hardware which performs the GPU tasks (e.g. data masters, shading clusters, texture pipelines and data post-processing modules). The GPU 54 also comprises an embedded microprocessor 58 which controls the operation of the GPU and a memory management unit (MMU) 15 within the GPU (and which may be referred to as the GPU guest MMU or GPU G-MMU to distinguish it from the root and guest MMUs external to the GPU). The GPU 52 further comprises a SoC (system on chip) interface (SOCIF) 112 via which the microprocessor 58 can access GPU registers 114.

The GPU registers 114 are also accessible to the CPU 52 via the system bus 116 and SOCIF 112 because they are mapped in a MMU (e.g. the CPU root MMU 120) but as described in more detail below, access to different registers is controlled so that each VM (denoted $VM_0$-$VM_n$) can see a separate dedicated set of registers 126 and the hypervisor can see another set of registers 128 which is not accessible by the VMs. In contrast, the microprocessor 58 within the GPU 54 can see all of the GPU registers 114 (via the SOCIF 112).

The system 50 further comprises three further MMUs: the CPU guest MMU (CPU G-MMU) 118 and two root MMUs (R-MMUs) 120, 122. The two R-MMUs 120, 122 (which may also be referred to as 'system MMUs', 'IP MMUs', 'IO MMUs' or 'stage 2 MMUs') are set up by (and hence may be described as being controlled by) the hypervisor running on the CPU 52. Each MMU 15, 118, 120, 122 performs translation of memory addresses and may also perform other memory management functions. In a more conventional system with only one stage of MMU (rather than the two stages shown in FIG. 1) the MMUs convert virtual memory addresses (generated within the CPU/GPU) to physical memory addresses (and vice versa). In contrast, in the system 50 of FIG. 1, the CPU G-MMU 118 translates virtual addresses generated by the VMs to (and from) guest physical addresses (hence the name guest MMU) and these guest physical addresses are then converted to actual physical addresses by the CPU R-MMU 120 (hence the name root MMU) which is under the control of the hypervisor. Similarly, the GPU G-MMU 15 translates virtual addresses generated by the GPU to (and from) guest physical addresses and these guest physical addresses are then converted to actual physical addresses by the GPU R-MMU 122 which is also under the control of the hypervisor. Whilst it is possible for the two R-MMUs 120, 122 to be combined, they are still logically separate since a given VM has differing CPU and GPU access requirements.

By controlling the translations performed within the R-MMUs 120, 122, the hypervisor controls what transactions have access to the system bus 116. Although the mapping from a virtual address to a guest physical address by the CPU G-MMU 118 is managed by the operating system running on a VM; the hypervisor can block access to the system bus 116 by failing to map the guest physical address to an actual physical address in the CPU R-MMU 120.

Although FIG. 1 shows the R-MMUs 120, 122 as being an external component to the adjacent CPU/GPU, in other examples, the R-MMUs 120, 122 may be implemented as an integral part of the associated processor (e.g. CPU R-MMU 120 may be implemented as an integral part of the CPU 52 and/or GPU R-MMU 122 may be implemented as an integral part of the GPU 54, e.g. as an integral part of the GPU core 56).

Each of the sets of GPU registers 126 allocated to a VM (and which may be referred to as a 'register block') may, for example, consume 64 kB of space in the system physical address space map. This granularity may be selected to match the granularity of the R-MMUs. It will be appreciated that these addresses do not overlap RAM and hence these 64 kB regions do not actually consume memory (just space in the physical address map).

The physical addresses which are generated by the CPU R-MMU 120 may relate to the GPU registers 114 (in which case calls are received by the SOCIF 112, which monitors the range of addresses corresponding to the GPU registers (or a plurality of addresses where the addresses are not contiguous), via the system bus 116 or to memory 124 within the computing system 50, where this memory 124 provides the driver to firmware per VM control interfaces and may comprise RAM. The physical addresses which are generated by the GPU R-MMU 122 may relate to the VM driver/firmware interface memory 124 within the computing system 50.

It will be appreciated that a system 50 will comprise other memory aside from the VM driver/firmware interface memory 124, e.g. other CPU-only memory and CPU/GPU memory containing other GPU setup, textures and render buffers etc. and the address space occupied by the memory 124 need not be contiguous (e.g. other memory may exist in gaps between adjacent blocks 132).

It will be appreciated that other computing systems may not comprise all the functional elements shown in FIG. 1 (i.e. one or more of the functional elements shown in FIG. 1 may be omitted) and may, in some examples, comprise additional functional elements not shown in FIG. 1. For example, a variation on the system 50 shown in FIG. 1 may not comprise a SOCIF 112 and instead the GPU registers 114 may be memory mapped in GPU R-MMU 122 (i.e. to implement memory mapped register access and protection); however, this may introduce additional latency when accessing registers 114 from the microprocessor 58 in the GPU 54.

The operation of the system 50 can be described with reference to the flow diagram shown in FIG. 2 which shows an initialization phase 202 and an operational phase 204. During the initialization phase 202, which may be performed on system set-up or when a new VM is provisioned, the hypervisor allocates memory (e.g. from memory 124 and/or GPU registers 114) to a VM and also allocates an identifier (the OS_ID) to the VM (block 206). The OS_IDs may each comprise m bits and in various examples, the OS_IDs each comprise 3 bits (m=3), enabling each OS_ID to identify one of a maximum of 8 VMs (although as described below, in various examples one of the OS_IDs is allocated to the hypervisor). The hypervisor also sets up the translation tables (also referred to as 'page tables') within the R-MMUs 120, 122 (block 208) where the translations between a guest physical address and a real physical address are dependent upon on the OS_ID and so the translation tables may be indexed or selected by a R-MMU 120, 122 according to the OS_ID. Having allocated the memory and OS_ID (in block 206) and set up the R-MMUs (in block 208), the VMs can be loaded (block 25) and can start to execute (block 212).

During the operational (or execution) phase 204, the VMs execute and each transaction on the system bus 116 is identified by the OS_ID of the VM to which it relates (block 214). As described below, the hypervisor may also be allocated its own OS_ID so that it can be used to determine which parts of the memory the hypervisor can access. As each transaction is tagged with the OS_ID, OS_IDs effectively provide m more bits of address space. Transactions which do not originate from the VM inherit their OS_ID from the triggering transaction, such that output from the GPU inherits the OS_ID of the VM that submitted the GPU task that generated the output.

The OS_IDs are used by the R-MMUs 120, 122 to select the appropriate pages (block 216) and this controls which parts of the memory each VM can access (e.g. can read from and/or write to). In this way, each VM sees the same set of registers in the same location (i.e. the virtual addresses of these registers may be the same and these may be mapped to the same guest physical addresses by the CPU G-MMU), but cannot see registers in pages mapped to other VMs by the R-MMUs.

The use of the OS_IDs in combination with the R-MMUs which have been set-up by the hypervisor provides an efficient way to switch between different VMs (and hence different operating systems) as it is not necessary for the hypervisor to mediate every transaction in order to identify the VM to which it relates and to enforce security measures to protect rogue memory accesses (e.g. accesses by one VM to memory written by other VMs or other parts of the system). As described above, access to the system bus 116 can be blocked by failing to map a guest physical address to an actual physical address (in a R-MMU) and this is configured during the initialization phase 52 rather than needing to be performed on a transaction by transaction basis involving the hypervisor each time.

In order that individual VMs can independently submit GPU tasks to the GPU 54 without needing to involve the hypervisor, one of the registers in each dedicated set of registers 126 may be a special register 130 (referred to herein as a 'kick register') which triggers an event in the embedded microprocessor 58 within the GPU 54. In various examples there may only be a single register in the 64 kB address range which corresponds to the set of registers 126. Additionally dedicated portions 132 of the memory 124 operate as circular buffers (which may be referred to as host driver/firmware interfaces and comprise kernel command circular buffers, CCBs) for each VM (denoted HD/FI$_0$-HD/FI$_n$) and these operate as a command interface to the GPU with each VM only having access to its own host driver/firmware interface 132. As with the GPU registers 114, the microprocessor 58 in the GPU 54 can see all of the host driver/firmware interfaces 132, although the access mechanisms are different (the memory 124 is accessed via the GPU R-MMU 122 and the GPU registers 114 are accessed via the SOCIF 112). The operation of these host driver/firmware interfaces 132 and kick registers 130 can be described with reference to the flow diagram shown in FIG. 3.

Figure 2:
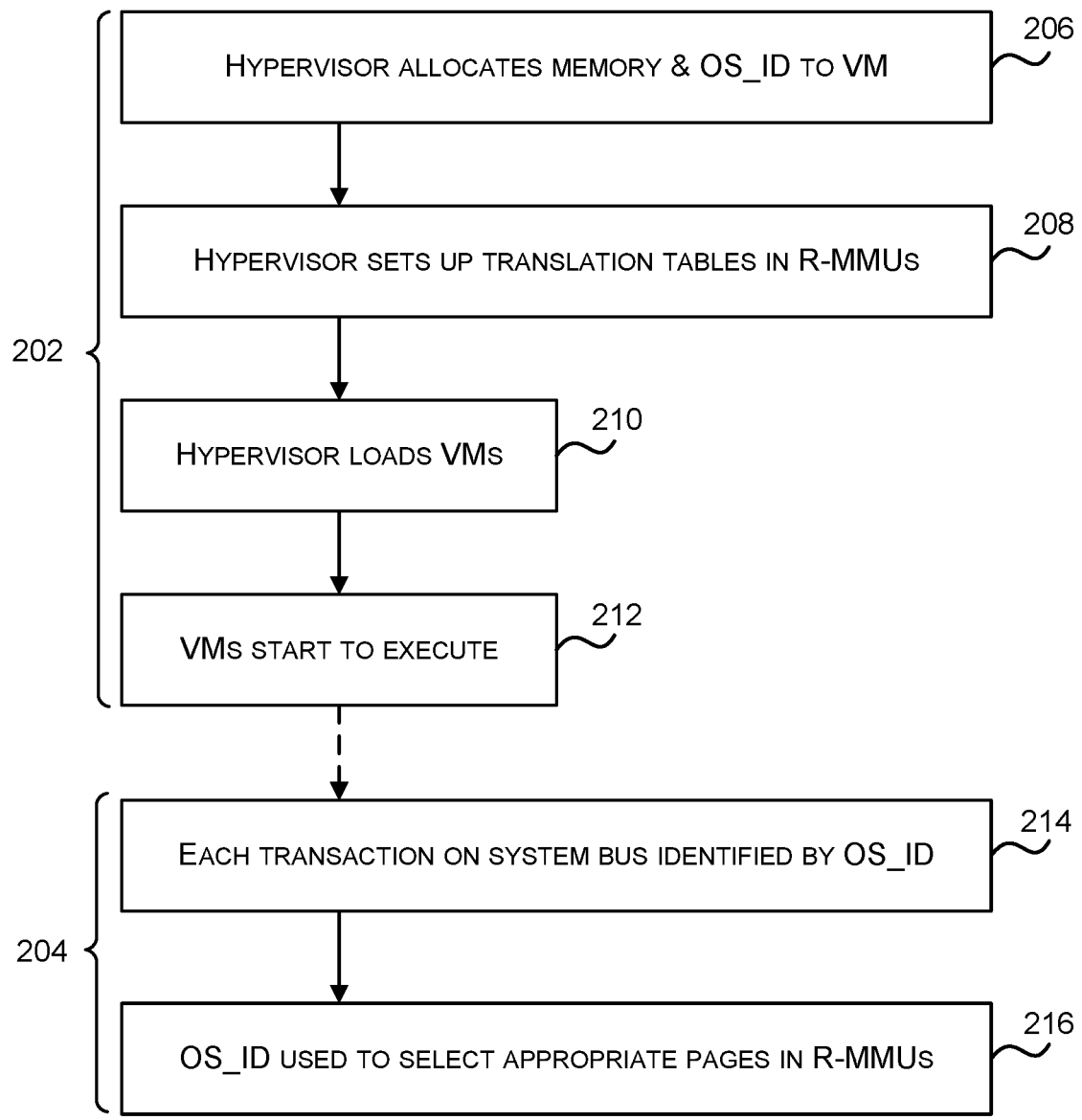
FIG. 2 is a flow diagram of an example method of operation of the system of FIG. 1.

The kick registers and the host driver/firmware interfaces are allocated to a VM on initialization, e.g. in block 206 in FIG. 2. The mapping between the virtual and guest physical addresses for the kick registers and host driver/firmware interfaces and their actual physical addresses is also set up within the R-MMUs by the hypervisor as part of the initialization phase 202 (e.g. in block 208).

When a VM (e.g. a graphical application within the VM) wishes to trigger a GPU task, the VM sets up the control streams in memory (block 302) and this may be done in a conventional manner, e.g. as if the VM was a native CPU with an associated GPU. The VM then writes a command to a generic command circular buffer (block 304), i.e. each VM running on the CPU can write a command using the same virtual address and guest physical address, and the guest physical address is then mapped to the VM specific physical address for the HD/FI by the CPU R-MMU 120 (block 306) so that the command can be stored (block 308). This setting up of the control stream (in block 302) and storing the command (in blocks 304-308) can be performed ahead of when the VM wants to submit the GPU task to the GPU.

To submit the GPU task to the GPU, the VM writes to a generic kick register (block 35) which may, in various examples, be the same for all VMs running on the CPU, i.e. each VM running on the CPU may, in various examples, use the same virtual and guest physical addresses for the kick register. As with the HD/FI address, the kick register address is mapped to a physical address for the kick register for the correct VM by the CPU R-MMU 120 (block 312) and this may be based on the OS_ID which is received by the CPU R-MMU 120 along with the write command or may use another mechanism which is present in the CPU to select the right mappings based on the current VM that is executing. As described above, the SOCIF 112 monitors the address range corresponding to the GPU registers 114 and so detects the write (block 314). As a result of the write to the VM specific kick register 130, an event is generated in the microprocessor 58 within the GPU 54 (block 316) and this triggers the running of a task by the microprocessor 58 (block 318). The OS_ID for the calling VM (which is derived directly from the kick register written to and which may be stored in a register internal to the microprocessor 58) is passed to the task which is running in the microprocessor (block 320), e.g. as side band information, and the OS_ID is then used to perform a translation and identify the address of the HD/FI for that particular VM (block 322), i.e. the OS_ID is used to calculate the right address for the VM, e.g. by offsetting the accesses to the right VM interface memory (as described in more detail below). This means that the GPU knows which VM triggered the event without needing to trust the VM to correctly identify itself or ask the hypervisor since each VM only has visibility to its own kick register by means of the CPU R-MMU. Having identified the correct HD/FI (in block 322), all necessary information to perform the GPU task can be read from memory (e.g. the control streams written in block 302 and the command written in blocks 304-308). The microprocessor 58 can read the previously written command from the HD/FI (block 324) and then based on the command, access all necessary data.

Based on the command which is read (in block 324) and if the GPU has capacity (e.g. if the particular pipeline within the GPU core that is required is not already executing another GPU task), the workload can be set up in the GPU by the microprocessor (block 326) and then the GPU can start the workload (block 328) without further involvement of the microprocessor.

If the GPU (e.g. the required GPU pipeline) is already busy when the kick is received (e.g. when the command is read in block 324), then it may be ignored by the microprocessor 58, in which case the workload will not be set up and the task will not be performed. In some example implementations, however, a record of the kicks received but not actioned may be stored so that when capacity within the GPU core is available a decision can be made (e.g. by a scheduler within the microprocessor) as to which GPU task to action next. In various implementations, the completion of a GPU task may trigger an interrupt to the microprocessor (block 320) e.g. so that resources used in the task can be freed up for use by another GPU task and this interrupt on completion may in turn trigger the start of a next GPU workload, e.g. such that the GPU tasks are triggered not by the kicks but by the completion of a previous GPU task (e.g. a previous GPU task utilizing the same resources as the triggered GPU task).

Figure 3:
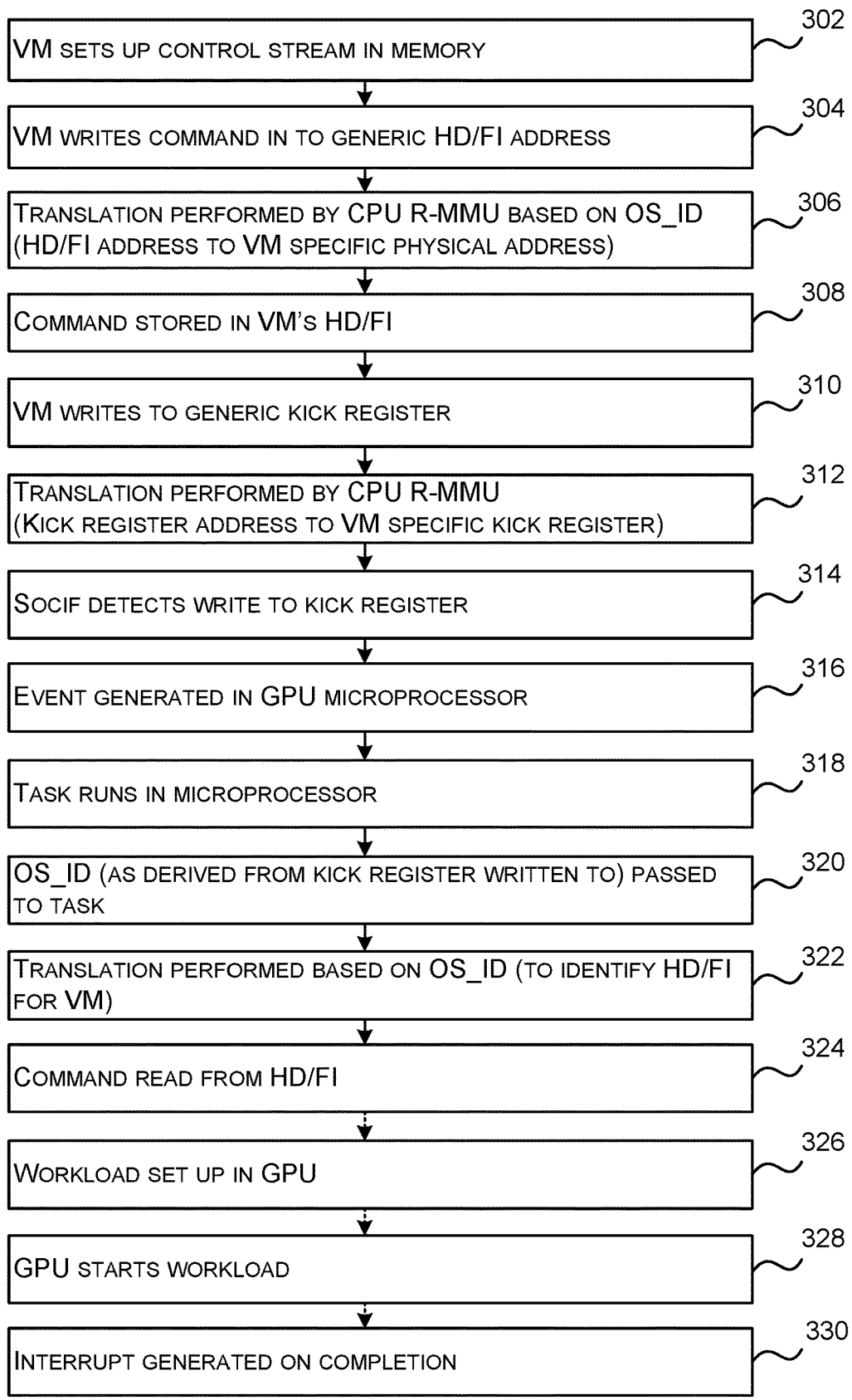
FIG. 3 is a flow diagram of another example method of operation of the system of FIG. 1.

In the description above there is a kick register allocated to each VM. In an alternative implementation, a single kick register may be provided which is used by all VMs. In such an implementation, the method of FIG. 3 starts as described above and having set up the control stream (in block 302) and written a command to the VM's specific HD/FI (in blocks 304-308), the VM writes to the generic kick register (in block 35). In this implementation, instead of the translation performed by the CPU R-MMU being from a generic address to a VM specific kick register (as in block 312), the translation is from the generic address to the single kick register. As described above, the SOCIF detects the write to the kick register (in block 314) and an event is generated in the microprocessor (in block 316) which triggers the running of a task (in block 318). However, unlike in FIG. 3, as there is only a single kick register, the OS_ID of the calling VM cannot be passed to the task and used to identify the HD/FI containing the corresponding command (i.e. blocks 320 and 322 of FIG. 3 are omitted). Instead, there are two different ways that the method can proceed. In one implementation, the microprocessor 58 inspects all the HD/FIs 132 to identify the one with a new command in it, so that the command can be read (in block 324) and then the method proceeds as shown in FIG. 3 and described above. In the other implementation, the calling VM makes a hypervisor call and the hypervisor serves as a secure proxy, attaching the OS_ID for the calling VM and then the method proceeds as shown in FIG. 3 and described above.

As the performance of the microprocessor is affected by external memory accesses (as there is a delay associated with each external memory access), using a single kick register introduces a performance penalty compared to having a kick register for each VM, because multiple accesses to the HD/FIs are required.

In a further example, a hybrid of the two approaches (dedicated kick register per VM and single kick register) may be used. In such an example, where there are more VMs than OS_IDs, one of the kick registers may be used by all VMs exceeding the OS_ID limit (e.g. for all those VMs which do not have their own unique OS_ID). In such an implementation, these VMs do make a hypervisor call or the firmware code running on the microprocessor 58 knows to scan N VM queues for this special case OS_ID.

The command which is written into the HD/FI (in blocks 304-306) may include a reference to the memory address at which the data has been stored in memory (in block 302). The reference to the memory address may be in the form of a pointer. In other examples, however, an offset may be specified instead of a pointer in order to provide a more secure interface, as can be described with reference to FIG. 4.

Figure 4:
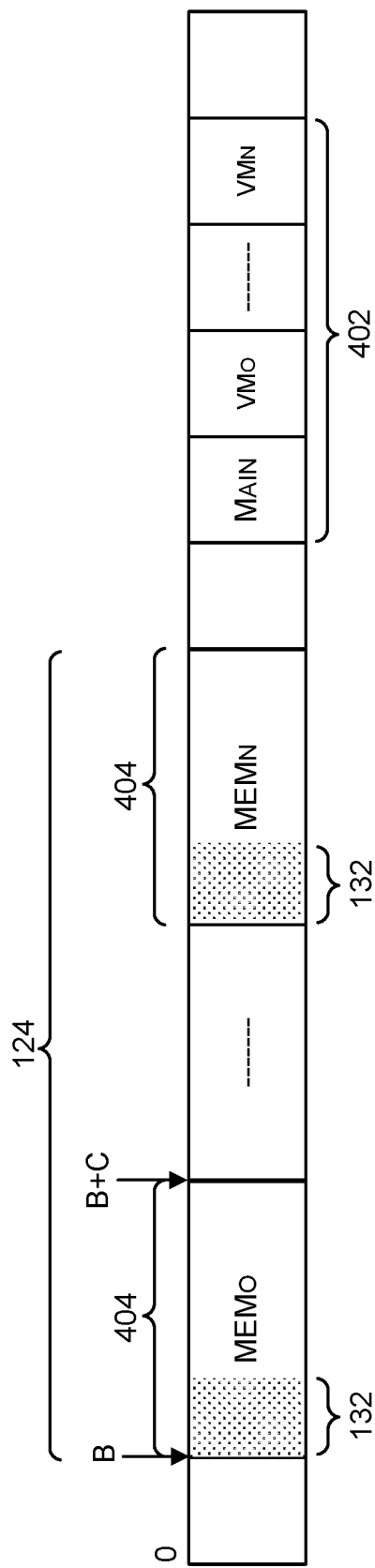
FIG. 4 shows a schematic diagram of the memory address space.

FIG. 4 shows a schematic diagram of the memory address space, which includes the addresses corresponding to the memory 124 in more detail. In this example, the memory addresses 402 to which the GPU registers 114 are mapped (in the CPU R-MMU 120) are shown along with the HD/FIs 132; however, it will be appreciated that whilst these GPU registers 114 occupy memory address space they do not occupy physical memory (i.e. they are not stored in RAM). Additionally portions of memory 404 which are reserved for each VM (denoted $MEM_0$-$MEM_n$) are shown in FIG. 4 and the HD/FIs 132 (and the CCBs within the HD/FIs) are sub-structures within the portions of memory 404. These portions of memory 404 are contiguous in virtual address space, so they appear contiguous to the microprocessor 58 and so instead of providing a pointer to the start of any data, an offset can be provided and the microprocessor 58 can calculate the actual memory address using:

$$\text{Address} = \text{base address} + (\text{OS\_ID} \times \text{portion size}) + \text{offset}$$

and where the base address, B, is the starting address for the portion of memory and the portion size, C, is the size of a portion, as shown in FIG. 4. In this way, non-trusted software can never generate pointers outside of their own secure container ($MEM_0$-$MEM_n$). The caller only supplies the offset which internally has the secure container base address applied (as above) as well as a range check to ensure that the offset does not overflow the secure container range from its base.

To make it possible to detect some malicious acts, the offset which is passed may be processed prior to being used to calculate the address (e.g. using the equation above). For example, a number of bits may be removed from the offset (e.g. based on the aperture size and/or OS_ID) and if it is detected that any of the removed bits have been changed (e.g. compared to standard values), the microprocessor can determine that there has been malicious activity and may as a result discard the GPU task.

All the description above refers to the use of the OS_ID for calls to the GPU from the CPU. The OS_ID may also be used by the GPU to determine where in memory to write data which is output from a GPU task and to prevent writes to memory (e.g. RAM) allocated to other VMs.

Any GPU read/write command from/to the memory 124 identifies a virtual address which is translated to a guest physical address by the GPU G-MMU 15. Based on the OS_ID associated with the command (where this refers not to an OS running on the GPU but the VM to which the data relates and is inherited from the initial GPU transaction), the guest physical address is then translated by the GPU R-MMU 122 into a real physical address. This prevents a GPU task for one VM writing data into memory which is allocated to a different VM (e.g. data for a task issued by $VM_0$ can only be written into memory portion $MEM_0$) and this means that the data is not available to other VMs and cannot inadvertently overwrite data belonging to another VM.

In various examples, the OS_ID which is passed by the CPU (and corresponds to calling VM) may be denoted CPU OS_ID and the OS_ID which is passed by the GPU (and corresponds to the VM being called) may be denoted GPU OS_ID. The hypervisor running on the CPU may have its own allocated OS_ID and these different OS_IDs may be used to control access to different portions of the memory 124 (or memory other than memory 124, as described above). For example, portions which are only accessible to the hypervisor and the GPU may only be mapped from/to guest physical addresses accompanied by a pre-defined CPU OS_ID or GPU OS_ID which corresponds to the hypervisor, portions which are available to the GPU and trusted software running on the CPU (i.e. not untrusted VMs) may only be mapped from/to guest physical addresses accompanied by a pre-defined CPU OS_ID or GPU OS_ID which corresponds to a trusted execution environment and portions which are only accessible to the CPU (and not the GPU) may only be mapped from/to guest physical addresses accompanied by a pre-defined CPU OS_ID which corresponds to the trusted execution environment (and not a corresponding GPU OS_ID).

The 'special' registers described above (e.g. register sets 126 and/or kick registers 130) enable untrusted software (e.g. the VMs or software running on the VMs) to talk directly to the GPU. Although the GPU does not trust any caller identity information provided by the VMs themselves (because the VMs are untrusted), the use of a single kick register or a dedicated kick registers for each VM (or a hybrid of these two approaches, as described above) provides a mechanism that cannot be spoofed by a rogue VM and does not require the hypervisor call to perform the 'kick' operation. This therefore enables each VM (or each OS running on a VM) to independently queue work on the GPU without hypervisor intervention and the use of the OS_ID to tag all transactions enables GPU tasks from different VMs to be run in parallel on different GPU pipelines.

As described above, although there is a single GPU shared between multiple VMs, each VM has its own driver stack (i.e. a full standard driver stack as if it was a single native machine) so to each VM it appears to have a dedicated virtualized GPU. This represents a cost saving (e.g. in terms of chip area and efficiency) compared to a SoC with multiple GPUs, e.g. there is less redundant GPU hardware with one virtualized GPU rather than N dedicated GPUs. Furthermore, using the methods described above there is zero software overhead in switching the GPU across VMs.

Using the methods and apparatus described above, the virtualization of the GPU is mediated inside within the GPU (e.g. the firmware runs inside the GPU) and so this is transparent to the CPU and to the VMs running on the CPU. This is in contrast to mediated pass-through where the mediation between the 'virtual GPUs' happens in the host CPU.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component, unit or logic (e.g. the components of the graphics processing system 202) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture a graphics processing system will now be described with respect to FIG. 5.

Figure 5:
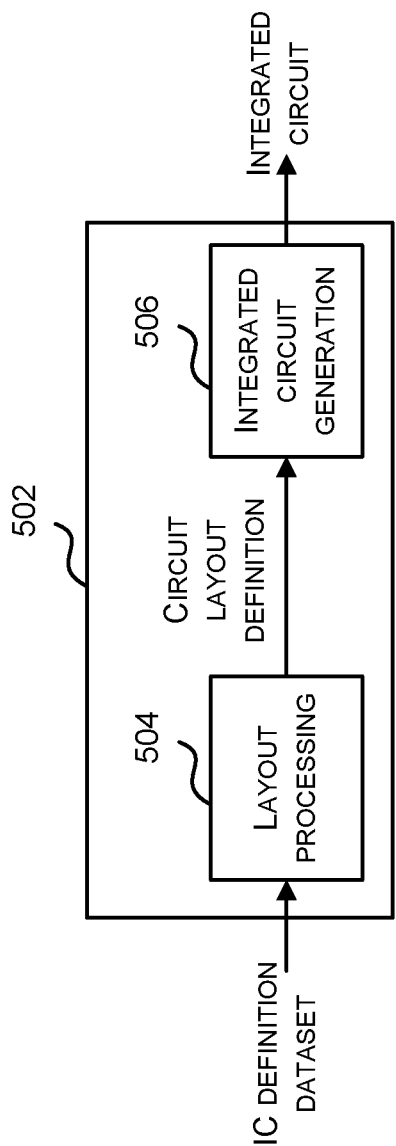
FIG. 5 shows an example of an integrated circuit manufacturing system which comprises a layout processing system and an integrated circuit generation system.

FIG. 5 shows an example of an integrated circuit (IC) manufacturing system 502 which comprises a layout processing system 504 and an integrated circuit generation system 506. The IC manufacturing system 502 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 502 to manufacture an integrated circuit embodying a graphics processing system as described in any of the examples herein. More specifically, the layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC. The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described above to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A graphics processor unit (GPU) arranged to operate with a central processing unit (CPU) running a plurality of virtual machines under the control of a hypervisor, wherein transactions output from the CPU are assigned an identifier for the virtual machine to which it relates, the GPU comprising:
   a GPU memory management unit arranged to translate between virtual memory addresses used by the graphics processor unit and guest physical addresses; and
   a root memory management unit configured by the hypervisor and arranged to translate between guest physical addresses used by the GPU memory management unit and actual physical memory addresses based on the identifier for the virtual machine assigned to the transaction;
   wherein access to one or more portions of a memory resource is controlled as a consequence of the address translations performed by the root memory management unit;
   wherein each transaction is a transaction on a system bus which interconnects the CPU, GPU and other peripherals; and
   wherein the assigned identifier in combination with the root memory management unit enables mediation of some or all transactions without hypervisor intervention.

2. The graphics processor unit according to claim 1, wherein the memory resource comprises a plurality of GPU registers and each portion of the memory resource comprises one or more GPU registers and is assigned to one of the virtual machines.

3. The graphics processor unit according to claim 2, wherein the GPU registers have a corresponding actual physical memory address and access to the GPU registers by a virtual machine is controlled as a consequence of the address translations performed by the root memory management unit.

4. The graphics processor unit according to claim 2, further comprising an interface unit in communication with a microprocessor in the GPU and GPU registers and wherein access to the GPU registers by the microprocessor is provided via the interface.

5. The graphics processor unit according to claim 4, wherein each of the GPU registers have a corresponding actual physical memory address and access to the GPU registers by a virtual machine is controlled as a consequence of the address translations performed by the root memory management unit and the interface unit is configured to monitor a plurality of physical memory addresses corresponding to the GPU registers.

6. The graphics processor unit according to claim 2, wherein one GPU register in each portion of the memory resource comprises a kick register and wherein a microprocessor in the GPU is configured to run a task in response to a virtual machine writing to the kick register in its assigned portion of the memory resource.

7. The graphics processor unit according to claim 6, wherein an identifier for the virtual machine writing to the kick register is provided as an input to the task.

8. The graphics processor unit according to claim 2, wherein one GPU register in one portion of the memory resource comprises a kick register and wherein a microprocessor in the GPU is configured to run a task in response to a virtual machine writing to the kick register.

9. The graphics processor unit according to claim 1, wherein access to a plurality of portions of a second memory resource is controlled as a consequence of the address translations performed by the root memory management units.

10. The graphics processor unit according to claim 9, wherein the second memory resource comprises RAM and each of the plurality of portions of the second memory resource is assigned to one of the virtual machines.

11. The graphics processor unit according to claim 10, wherein each of the plurality of portions of the second memory resource comprises a circular buffer.

12. The graphics processor unit according to claim 10, wherein a GPU register in a portion of the memory resource comprises a kick register and wherein the CPU is configured to run a task in response to a virtual machine writing to the kick register and the task is configured to access a command stored in the portion from the plurality of portions of the second memory resource assigned to the virtual machine writing to the kick register.

13. The graphics processor unit according to claim 12, wherein the graphics processor unit comprises a GPU core and a microprocessor in the GPU is configured to set up a GPU task for execution by the GPU core based on the accessed command and optionally based on other data accessed from the portion of the second memory resource assigned to the virtual machine writing to the kick register.

14. The graphics processor unit according to claim 1, wherein failure to map a guest physical address to an actual physical address during initialisation of said CPU results in access to the system bus being blocked.

15. The graphics processor unit according to claim 1, wherein one of the plurality of virtual machines enables a transaction without hypervisor intervention via a kick register which triggers an event in an embedded microprocessor within the GPU.

16. A method of virtualizing a graphics processor unit (GPU) for operation with a central processing unit (CPU) running a plurality of virtual machines under the control of a hypervisor that has allocated an identifier to each of the plurality of virtual machines, the method comprising:
configuring a translation table in a root memory management unit associated with the GPU, wherein the translation table defines translations between guest physical addresses and actual physical memory addresses based on an identifier for the virtual machine; and
during execution of one or more of the virtual machines, receiving transactions output by the CPU with the identifier for the virtual machine to which the transaction relates and, within the root memory management unit, translating addresses in a transaction based on the identifier with which the transaction is tagged, wherein each transaction is a transaction on a system bus which interconnects the CPU, GPU and other peripherals; and
using the assigned identifier in combination with the root memory management unit to enable mediation of some or all transactions without hypervisor intervention.

17. The method according to claim 16, wherein the GPU includes a memory resource comprising one or more GPU registers, each of the one or more GPU registers having a corresponding actual physical memory address and the method further comprising:
monitoring, within the graphics processor unit, physical memory addresses corresponding to the one or more GPU registers; and
in response to detecting a write to a physical memory address corresponding to one of the one or more GPU registers, running a task in a microprocessor in the graphics processor unit.

18. The method according to claim 17, further comprising:
providing the identifier for the virtual machine writing to the one of the one or more GPU registers as an input to the task.

19. The method according to claim 18, further comprising:
using the identifier to access a circular buffer allocated to the virtual machine writing to the one or more GPU registers;
reading a command from the circular buffer; and
setting up workload in the graphics processor unit based on the command.

20. A non-transitory computer readable storage medium having stored thereon a computer readable dataset description of an integrated circuit that, when processed in an integrated circuit manufacturing system, causes the integrated circuit manufacturing system to manufacture a graphics processor unit (GPU) arranged to operate with a central processing unit (CPU) running a plurality of virtual machines under the control of a hypervisor, wherein transactions output from the CPU are assigned an identifier for the virtual machine to which it relates, the GPU comprising:
a GPU memory management unit arranged to translate between virtual memory addresses used by the graphics processor unit and guest physical addresses; and
a root memory management unit configured by the hypervisor and arranged to translate between guest physical addresses used by the GPU memory management unit and actual physical memory addresses based on the identifier for the virtual machine assigned to the transaction;
wherein access to one or more portions of a memory resource is controlled as a consequence of the address translations performed by the root memory management units;
wherein each transaction is a transaction on a system bus which interconnects the CPU, GPU and other peripherals; and
wherein the assigned identifier in combination with the root memory management unit enables mediation of some or all transactions without hypervisor intervention.

* * * * *

UNITED STATES PATENT AND TRADEMARK OFFICE
CERTIFICATE OF CORRECTION

PATENT NO. : 10,802,985 B2
APPLICATION NO. : 16/442138
DATED : October 13, 2020
INVENTOR(S) : Dave Roberts, Mario Sopena Novales and John W. Howson It is certified that error appears in the above-identified patent and that said Letters Patent is hereby corrected as shown below:

On the Title Page

Please enter the missing Foreign Application Priority Data:
-- (30) Foreign Application Priority Data
Dec. 2, 2015 (GB) 1521250.9 --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*